July 8, 1958 E. NORMAN 2,842,085
SHIP'S BUMPER
Filed Feb. 7, 1956
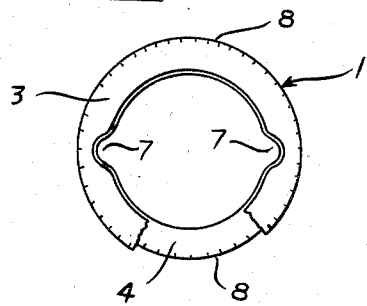
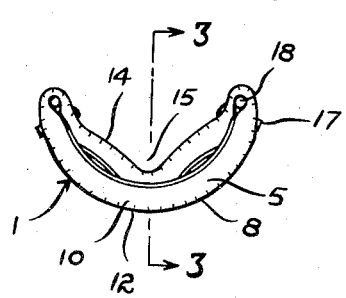
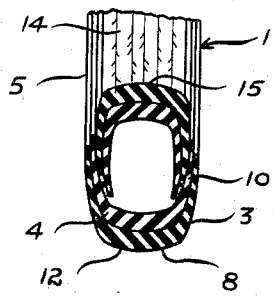
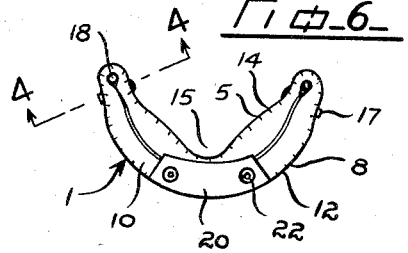
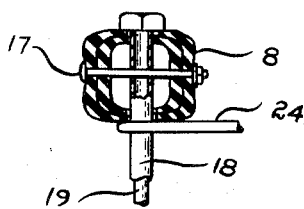
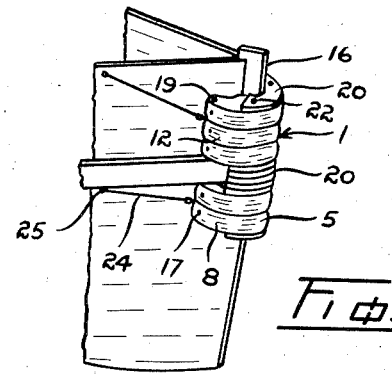
INVENTOR
EINAR NORMAN
ATTORNEY

United States Patent Office 2,842,085
Patented July 8, 1958

2,842,085

SHIP'S BUMPER

Einar Norman, Vancouver, British Columbia, Canada

Application February 7, 1956, Serial No. 564,011

5 Claims. (Cl. 114—219)

My invention relates to improvements in ship's bumpers.

The objects of the present invention are to provide a bumper adapted for attachment to the stem post of a vessel, such as tugs and various vessels of fishing fleets which will be durable, substantially free from disintegration through frictional wear, or water saturation, and which will be capable of withstanding heavy shock and provide for a great extent of distortion incidental to contact with a wharf or stationary structure before reaching the extent of its ultimate compression.

A further object is to utilize used tires in the construction of the bumper and to provide simple means whereby the bumper may be secured to the stem of the vessel so that somewhat extensive relative vertical movement can take place between the bumper and the nose of the vessel without causing damage to either the vessel or the bumper.

Referring to the accompanying drawings:

Figure 1 is a plan view of the outer tires used in the invention.

Figure 2 is an elevation of the invention mounted in place on the stem of a vessel.

Figure 3 is a sectional view taken on the line 3—3 of Figure 5.

Figure 4 is a sectional view taken on the line 4—4 of Figure 6.

Figure 5 is a plan view of a section of the bumper prior to joining the sections in superposed relation.

Figure 6 is a plan view of a section of the finished bumper.

In the drawings like characters of reference indicate corresponding parts in each figure.

The numeral 1 indicates a pair of tires from which the beads are preferably removed, one of the pair being laid within the other as shown in Figure 3, to respectively form an outer ply 3 and an inner ply 4 of a bumper section 5. At diametrically opposite points of the pair of tires substantially semi-circular portions of the side walls of said tires are removed to define gaps 7 which so reduce the resistance of the tread portions 8 of the tires to flexure that the said tread portions may be folded together as at 10 to produce an arcuate member such as is illustrated in Figures 5 and 6. The folding together of the tread portions causes the side wall portions of the tires which are deformed to lie partly within the normally curved or bumper surface portion 12 of the bumper section 5, as shown particularly in Figures 3 and 4, and form a prow contacting area 14 which will be substantially angular in plan with a relatively sharp intersecting angle 15 which will engage the stem post 16 of the vessel. Bolts 17 are used adjacent the folds 10 to maintain the tire parts in folded position and metal sleeves 18 may, if desired, be secured within said folds to facilitate passing a bolt 19 through all the bumper sections 5 which are used to make up a complete bumper as shown in Figure 2.

When a bumper is made up of a plurality of sections as shown, it is desirable to maintain said sections tightly secured together close to the stem post of the vessel, so that I place an arcuate binder plate 20 on the top and bottom respectively of the top and bottom bumper sections. This plate is preferably made from a side wall part of a tire and has the conventional fabric inner play to strengthen it against lateral strain. Bolts 22 are passed vertically downward through the assembled sections to unite them against vertical separation.

If it is necessary to provide a bumper in which some of its sections 5 are above and some are below the sheer strakes of the vessel, several of the binder plates 20 are interposed between the upper and lower sections, see Figure 2, so that their ends meet the vertical face of the said strakes and the uniting of the whole of the binder plates and sections is done with the bolts 22.

The completed bumper as shown in Figure 2 is adapted to be held in place on the upper part of the stem post 16 by short cables 24 which are eyed at one end as at 25 for the bolts 19 to pass through and are fastened at their free ends to the vessel's planking as shown in Figure 2.

What I claim as my invention is:

1. A ship's bumper section comprising a pneumatic tire having a tread and a pair of side walls, said tire being collapsed diametrally to form end folds and two arcuate halves, one of said halves being partially nested in the other, one of said halves retaining substantially its semi-circular form with the tread on its convex face and the other half being distorted to a substantially V-shaped form with the tread on its inner face, and means uniting the two halves together adjacent the folds.

2. A ship's bumper consisting of a plurality of bumper sections formed as described in claim 1, and connected together as a unit in side wall to side wall contact.

3. A ship's bumper section comprising a pair of pneumatic tires substantially U-shaped in cross section and nested one inside the other, said tires being collapsed diametrally to form end folds and two substantially arcuate portions, one of said arcuate portions being partially nested in the other, one of said arcuate portions retaining substantially its semi-circular form with the tread on its outer periphery and the other arcuate portion being distorted to a substantially V-shaped form, and means adjacent the end folds for uniting the arcuate portions together.

4. A ship's bumper section as claimed in claim 1, wherein the uniting means is a bolt passing through the treads adjacent the juncture of the arcuate halves.

5. A ship's bumper formed of a plurality of superposed bumper sections as defined in claim 1, said sections being united together by vertical bolts extending through each of the side walls and intermediate the end folds and other vertical bolts extending between some of the end folds, and means connecting said second named bolts for securing the bumper to the hull of a vessel.

References Cited in the file of this patent

UNITED STATES PATENTS 2,562,957     Sipken et al. _____ Aug. 7, 1951

FOREIGN PATENTS 532,304     Great Britain _____ Jan. 21, 1941